(12) United States Patent
Kumagai et al.

(10) Patent No.: US 6,923,218 B2
(45) Date of Patent: Aug. 2, 2005

(54) FUEL HOSE AND PRODUCING METHOD THEREFOR

(75) Inventors: Hiroshi Kumagai, Kanagawa (JP);
Katsumi Morohoshi, Kanagawa (JP);
Mitsuo Yamada, Kanagawa (JP);
Masami Honma, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/431,380

(22) Filed: May 8, 2003

(65) Prior Publication Data

US 2003/0221735 A1 Dec. 4, 2003

(30) Foreign Application Priority Data

May 29, 2002 (JP) ........................................ 2002-156026

(51) Int. Cl.[7] .............................................. F16L 11/00
(52) U.S. Cl. ...................... 138/109; 138/110; 138/137; 428/36.91
(58) Field of Search .................. 138/109, 137, 138/110; 428/36.91

(56) References Cited

U.S. PATENT DOCUMENTS

| | | | | |
|---|---|---|---|---|
| 4,106,526 A | * | 8/1978 | Szentmihaly | 138/109 |
| 5,279,874 A | * | 1/1994 | Ichikawa et al. | 428/36.8 |
| 5,472,746 A | * | 12/1995 | Miyajima et al. | 427/468 |
| 5,518,035 A | * | 5/1996 | Hoshishima et al. | 138/109 |
| 5,678,610 A | * | 10/1997 | Scarazzo et al. | 138/109 |
| 5,829,483 A | * | 11/1998 | Tukahara et al. | 138/109 |
| 5,957,163 A | * | 9/1999 | Ito et al. | 138/109 |
| 6,409,225 B1 | * | 6/2002 | Ito | 285/222.1 |
| 6,517,118 B2 | * | 2/2003 | Kato et al. | 285/222.1 |
| 2001/0046111 A1 | * | 11/2001 | Koike et al. | 361/215 |
| 2002/0140225 A1 | * | 10/2002 | Nishiyama et al. | 285/222.1 |

FOREIGN PATENT DOCUMENTS

| | | |
|---|---|---|
| JP | 08-108499 | 4/1996 |
| JP | 8-108499 A | 4/1996 |
| JP | 2000-291849 | 10/2000 |
| JP | 2002-144486 | 5/2002 |

OTHER PUBLICATIONS

"Hardness Testing Methods for Rubber, Vulcanized or Thermoplastic", Japanese Industrial Standard, JIS K 6253, 1997, pp. 1–22.

* cited by examiner

*Primary Examiner*—James Hook
(74) *Attorney, Agent, or Firm*—Foley & Lardner LLP

(57) ABSTRACT

A fuel hose for an automotive vehicle has an end section to which a connection-partner member is to be fitted. The fuel hose comprises an innermost layer formed of rubber or synthetic resin. The innermost layer has an inner surface defining an opening through which fuel flows and has an end section corresponding to the end section of the fuel hose. An outer layer is formed outside the innermost layer and formed of a material lower in fuel permeability coefficient than the innermost layer. Additionally, an end covering material is formed covering a surface region of the innermost layer which surface region includes the inner surface at a part extending from a sealing position to an end face of the innermost layer and the end face of the innermost layer. The end covering material is lower in fuel permeability coefficient than the innermost layer.

15 Claims, 1 Drawing Sheet

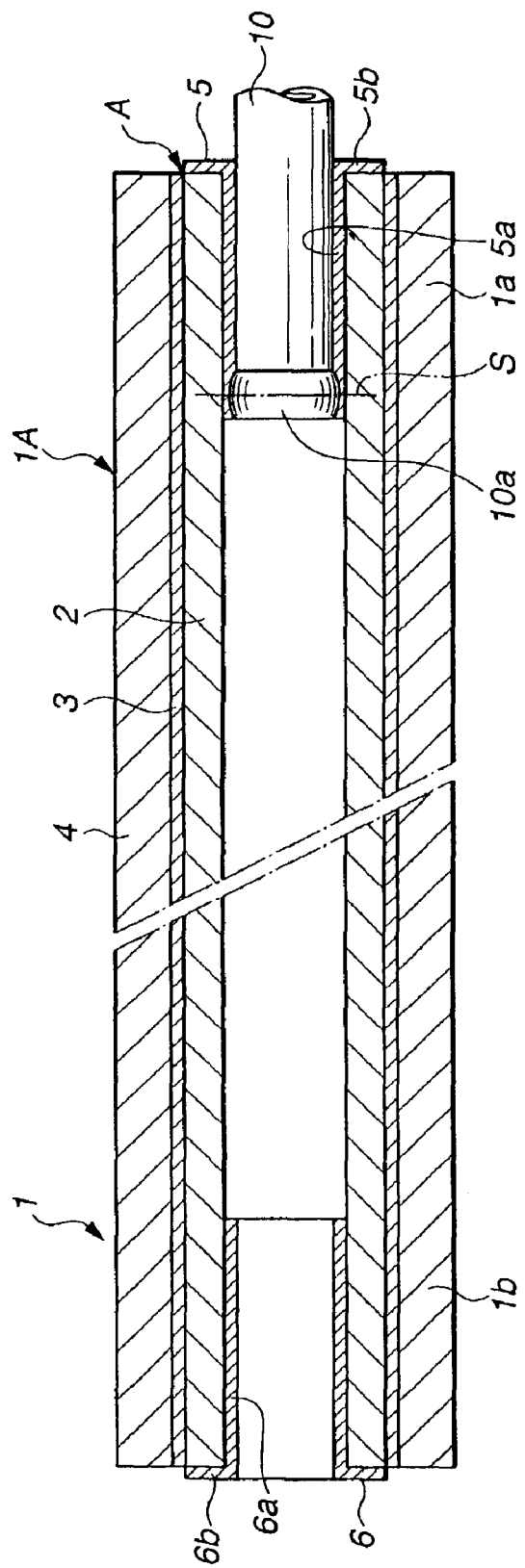

FUEL HOSE AND PRODUCING METHOD THEREFOR

BACKGROUND OF THE INVENTION

This invention relates to improvements in a fuel hose to be used for an automotive vehicle or the like, and in a method of producing the fuel hose, and more particularly to the improvements in the fuel hose to be used in an evaporative emission control system.

In general, fuel hoses for an automotive vehicle take a multiple layer structure including layers formed of rubber and synthetic resins excellent in fuel permeation resistance in order to prevent emission of fuel vapor. An example of such fuel hoses is disclosed in Japanese Patent Provisional Publication No. 8-108499 and has a three layer structure including an innermost layer, a intermediate layer and an outermost layer. The innermost layer is formed of an elastomeric material such as acrylonitrile-butadiene copolymer rubber (NBR) or fluororubber (FKR) in order to ensure the sealing ability to a connection-partner pipe and the pull-out force of the fuel hose. The intermediate layer is formed of fluororesin such as tetrafluoroethylene-hexafluoropropylene-vinylidene fluoride copolymer (THV) so as to serve as a barrier layer. The outermost layer is formed of epichlorohydrin rubber (ECO) or a blend (NBR/PVC) of acrylonitrile-butadiene copolymer rubber.

SUMMARY OF THE INVENTION

In the above fuel hose, the innermost layer is formed of the rubber for the purpose of securing the sealing ability to the connection-partner pipe which is to be fitted into the opening of an end section of the fuel pipe. In this case, even if the innermost layer is formed of fluororubber which is lower in fuel permeability in rubbers, the rubber is very high in fuel permeability as compared with the fluororesin used for the intermediate layer as the barrier layer. Consequently, in the above conventional fuel hose, fuel permeation in a direction of thickness (radial direction) can be blocked by the intermediate layer; however, fuel permeation in a longitudinal direction of the innermost layer cannot be blocked particularly at an end section of the fuel hose.

It is, therefore, an object of the present invention to provide an improved fuel hose and an improved method of producing the fuel hose, which can overcome drawbacks encountered in conventional fuel hoses and conventional producing method for fuel hoses.

Another object of the present invention is to provide an improved fuel hose and an improved method of producing the fuel hose, by which fuel permeation through the end section of the fuel hose can be largely reduced while ensuring a sufficient sealing ability to a connection-partner member which is to be fitted in the opening of an end section of the fuel hose and a sufficient pull-out force required for pulling out the connection-partner member from the fuel hose.

An aspect of the present invention resides in a fuel hose having an end section to which a connection-partner member is to be fitted. The fuel hose comprises an innermost layer formed of a material selected from the group consisting of rubber and synthetic resin. The innermost layer has an inner surface defining an opening through which fuel flows and has an end section corresponding to the end section of the fuel hose, the connection-partner member being to be inserted into the opening at the end section. An outer layer is formed outside the innermost layer and formed of a material lower in fuel permeability coefficient than the innermost layer. Additionally, an end covering material is formed covering a surface region of the innermost layer which surface region includes the inner surface at a part extending from a sealing position to an end face of the innermost layer and the end face of the innermost layer. The end covering material is lower in fuel permeability coefficient than the innermost layer.

Another aspect of the present invention resides in a fuel hose having an end section to which a connection-partner member is to be fitted. The fuel hose comprises an innermost layer formed of a material selected from the group consisting of rubber and synthetic resin. The innermost layer has an inner surface defining an opening through which fuel flows and has an end section corresponding to the end section of the fuel hose, the connection-partner member being to be inserted into the opening at the end section. An outer layer is formed outside the innermost layer and formed of a material lower in fuel permeability coefficient than the innermost layer. Additionally, a modified surface portion forming part of the innermost layer is located covering a surface region of the innermost layer which surface region includes the inner surface at a part extending from a sealing position to an end face of the innermost layer and the end face of the innermost layer. The modified surface portion is lower in fuel permeability coefficient than the innermost layer.

A further aspect of the present invention resides in a method of producing a fuel hose having an end section to which a connection-partner member is to be fitted. The fuel hose includes an innermost layer formed of a material selected from the group consisting of rubber and synthetic resin, the innermost layer having an inner surface defining an opening through which fuel flows and having an end section corresponding to the end section of the fuel hose, the connection-partner member being to be inserted into the opening at the end section; an outer layer formed outside the innermost layer and formed of a material lower in fuel permeability coefficient than the innermost layer; and an end covering material formed covering a surface region of the innermost layer, the surface region including the inner surface at a part extending from a sealing position to an end face of the innermost layer and the end face of the innermost layer, the end covering material being lower in fuel permeability coefficient than the innermost layer. The method comprises (a) coating at least one of adhesive and primer at least at the surface region of the innermost layer; (b) coating a solution of material of the end covering material at least on the coated at least one of adhesive and primer; and (c) heating the coated solution to form a film of the end covering material on the innermost layer at least at the surface region, the film being adhered to the innermost layer.

A still further aspect of the present invention resides in a method of producing a fuel hose having an end section to which a connection-partner member is to be fitted. The fuel hose includes an innermost layer formed of a material selected from the group consisting of rubber and synthetic resin, the innermost layer having an inner surface defining an opening through which fuel flows and having an end section corresponding to the end section of the fuel hose, the connection-partner member being to be inserted into the opening at the end section; an outer layer formed outside the innermost layer and formed of a material lower in fuel permeability coefficient than the innermost layer; and an end covering material formed covering a surface region of the innermost layer, the surface region including the inner surface at a part extending from a sealing position to an end face of the innermost layer and the end face of the innermost layer, the end covering material being lower in fuel permeability coefficient than the innermost layer. The method comprises (a) forming the innermost layer of rubber; (b) coating a solution of material of the end covering material at least at the surface region of the innermost layer before valcanization of the innermost layer; and (c) forming the end covering material as a film and adhering the end covering material to the innermost layer upon heat treatment in a valcanization process of the innermost layer.

A still further aspect of the present invention resides in a method of producing a fuel hose having an end section to which a connection-partner member is to be fitted. The fuel hose includes an innermost layer formed of a material selected from the group consisting of rubber and synthetic resin, the innermost layer having an inner surface defining an opening through which fuel flows and having an end section corresponding to the end section of the fuel hose, the connection-partner member being to be inserted into the opening at the end section; an outer layer formed outside the innermost layer and formed of a material lower in fuel permeability coefficient than the innermost layer; and an end covering material formed covering a surface region of the innermost layer, the surface region including the inner surface at a part extending from a sealing position to an end face of the innermost layer and the end face of the innermost layer, the end covering material being lower in fuel permeability coefficient than the innermost layer. The method comprises (a) coating a material of the end covering material at least at the surface region of the innermost layer under electrodeposition; and (b) heating the coated material of the end covering material to form the end covering material as a film.

A still further aspect of the present invention resides in a method of producing a fuel hose having an end section to which a connection-partner member is to be fitted. The fuel hose includes an innermost layer formed of a material selected from the group consisting of rubber and synthetic resin, the innermost layer having an inner surface defining an opening through which fuel flows and having an end section corresponding to the end section of the fuel hose, the connection-partner member being to be inserted into the opening at the end section; an outer layer formed outside the innermost layer and formed of a material lower in fuel permeability coefficient than the innermost layer; and a modified surface portion forming part of the innermost layer and located covering a surface region of the innermost layer, the surface region including the inner surface at a part extending from a sealing position to an end face of the innermost layer and the end face of the innermost layer, the modified surface portion being lower in fuel permeability coefficient than the innermost layer. The method comprises allowing at least the surface region of the innermost layer to contact with a solution containing a compound selected from the group consisting of hydrogen peroxide and hypochlorous acid so that the modified surface portion is formed at least at the surface region of the innermost layer.

BRIEF DESCRIPTION OF THE DRAWING

FIG. 1 is a longitudinal sectional view of an embodiment of a fuel hose according to the present invention.

DETAILED DESCRIPTION OF THE INVENTION

Referring now to FIG. 1, an embodiment of a fuel hose according to the present invention is illustrated by the reference numeral 1. Fuel hose 1 comprises a generally cylindrical innermost layer 2 formed of a rubber which is excellent in fuel resistance. A generally cylindrical intermediate layer (as a barrier layer) coaxially lies on innermost layer 2 and is formed of a resin which is lower in fuel permeability coefficient than innermost layer 2. A generally cylindrical outermost layer 3 lies coaxially on intermediate layer 3 and is formed of a rubber which is excellent in weatherability. In this embodiment, fuel hose 1 takes a three-layer structure. These innermost, intermediate and outermost layers 2, 3, 4 constitute a hose main body 1A.

More specifically, innermost layer 2 is formed of acrylonitrile-butadiene copolymer rubber (NBR), a blend of acrylonitrile-butadiene copolymer rubber and polyvinyl chloride, or fluororubber. Intermediate layer 3 is formed of a fluororesin such as ethylene-tetrafluoroethylene copolymer, polyvinylidene fluoride (PVDF), tetrafluoroethylene-hexafluoropropylene-vinylidene fluoride copolymer (THV), or the like. Additionally, intermediate layer 3 may be formed of polyamide-based resin, polyester-based resin, or the like. Outermost layer 4 is formed of acrylonitrile-butadiene copolymer rubber (NBR), a blend (NBR/PVC) of acrylonitrile-butadiene copolymer rubber and polyvinyl chloride, epichlorohydrin rubber (ECO), or the like.

Each of innermost, intermediate and outermost layers has a thickness which is freely decided according to characteristics required to the layer. Although fuel hose 1 has been shown and described as having a constant diameter throughout its length and having an annular cross-section, it will be understood that the fuel hose may have a flat annular cross-section, or be longitudinally curved or longitudinally bellows-shaped.

Fuel hose 1 has first and second end sections 1a, 1b which have respectively end faces (no numeral). It will be understood that the three-layer structure is appeared at each of the end faces of the fuel hose. Innermost layer 2 has a generally cylindrical inner peripheral surface (no numeral) defining a cylindrical opening (no numeral) through which fuel or fuel vapor is to flow, so that the cylindrical opening is formed through each of first and second end sections 1a, 1b of fuel hose 1. An end covering material 5 is formed to a first end section 1a of fuel hose 1 and has a cylindrical film section 5a which is adhered to the inner peripheral surface of first end section 1a of fuel hose 1. Cylindrical film section 5a extends from the end face of innermost layer 2 to a sealing position S at which sealing for fuel or fuel vapor between fuel pipe 1 and a connection-partner member or pipe 10 is made. An annular flange film section 5b is formed integral with cylindrical section 5a and radially outwardly extend to cover the annular end face of innermost layer 2. In other words, end covering material 5 securely covers a surface region of innermost layer 2 which surface region includes the inner peripheral surface at a part extending from the sealing position S to the end face of innermost layer 2 and the end face of innermost layer 2.

Connection-partner member 10 has a tip end section which is formed with a coaxial annular bead 10a located generally coaxial with innermost layer 2 and formed along the periphery of connection-partner member 10. It will be understood that annular bead 10a slightly bulges radially outwardly from the outer peripheral surface of the main cylindrical section of connection-partner member 10. Connection-partner member 10 is inserted into the cylindrical opening of fuel hose 1, more specifically, inserted into cylindrical section 5a of end covering material 5 in such a manner that bead 10a is in press contact with the inner surface of cylindrical section 5a of end covering material 5 at the position S.

End covering material 5 has a film thickness within a range of not larger 0.3 mm, in which a value obtained by multiplying a tensile elastic modulus (MPa) by the film thickness (mm) is within a range of from a value of larger than 0 to a value of not larger than 20.

Thus, fuel hose 1 can be sufficient in sealing ability to connection-partner member 10 and in pull-out force which is a force necessary for pulling out connection-partner member 10 from the end section of fuel hose 1. The sufficient sealing ability and pull-out force can be stably obtained in fuel hose 1. Concerning the film thickness of end covering material 5, if it exceeds 0.3 mm, fitting connecting-partner member 10 in the end section of fuel hose 1 becomes difficult. Accordingly, the film thickness of end covering material 5 is preferably within the range of not larger than 0.3 mm, so that high fittability and sealing ability for connection-partner member 10 can be obtained.

As shown in FIG. 1, annular flange section 5b of end covering material 5 sealingly covers the whole annular end face of innermost layer 2. In other words, annular flange section 5b radially outwardly extend from the annular end portion of cylindrical section 5a of end covering material 5 to intermediate layer 3, i.e., to a position indicated by an arrow A. This arrangement further reduces fuel permeation through the end face of the end section 1a of fuel hose 1.

Similarly, another end covering material 6 is formed to a second end section 1b of fuel hose 1 and has a cylindrical film section 6a which is adhered to the inner peripheral surface of second end section 1b of fuel hose 1. Cylindrical film section 6a extends from the end face of innermost layer 2 to the sealing position (S) at which sealing for fuel or fuel vapor between fuel pipe 1 and the connection-partner member 10 is made. An annular flange film section 6b is formed integral with cylindrical section 6a and radially outwardly extend to cover the annular end face of innermost layer 2. In other words, end covering material 6 securely covers a surface region of innermost layer 2 which surface region includes the inner peripheral surface at a part extending from the sealing position (S) to the end face of innermost layer 2 and the end face of innermost layer 2. Thus, end covering material 6 is similar in structure to end covering member 5 and therefore functions similarly to end covering member 5.

Producing methods of fuel hose 1 will be discussed hereinafter.

An example of the producing method is as follows: Adhesive or primer is coated at the inner peripheral surface and end faces of hose main body 1A. Thereafter, a solution of the material of end covering material 5 is coated at the inner peripheral surface of the end sections and at a necessary part of the end faces of hose main body 1A. The coated solution is subjected to heating treatment so as to form end covering material 5 as a film and to allow the end covering material 5 to securely adhere to the surface of innermost layer 2. This method can provide end covering material 5 high in adhesion reliability to innermost layer 2, stable in strength and low in fuel permeability, thus largely reducing fuel permeation through the end sections of fuel hose 1.

Another example of the producing method is as follows: Particularly in case that innermost layer 2 is formed of a rubber such as acrylonitrile-butadiene copolymer rubber (NBR) or fluororubber, first the rubber in an unvulcanized state is subjected to extrusion forming to form innermost layer 2. Then, a solution of the material of end covering material 5 such as tetrafluoroethylene-hexafluoropropylene-vinylidene fluoride copolymer (THV) is coated at the inner peripheral surface of the hose main body 1A and at the end faces of hose main body 1A. Thereafter, the coated solution undergoes a heating treatment in a vulcanizing process for innermost layer 2, in which the film of end covering material 5 is formed on and securely adhered to the surface of innermost layer 2. Also this producing method can provide end covering material 5 high in adhesion reliability to innermost layer 2, stable in strength and low in fuel permeability, thus largely reducing fuel permeation through the end sections of fuel hose 1.

A further producing method is as follows: In case that innermost layer 2 is formed of acrylonitrile-butadiene copolymer rubber (NBR), fluororubber, thermoplastic elastomer or the like, powder of resin material of end covering material 5 such as polyamide-based resin, fluororesin or the like is subjected to electrodeposition coating so that the powder resin material is coated at the inner peripheral surface of hose main body 1A and at the end faces of hose main body 1A. Thereafter, the coated powder material undergoes a heating treatment thereby forming a film of end covering material 5. Also this producing method can provide end covering material 5 high in adhesion reliability to innermost layer 2, stable in strength and low in fuel permeability, thus largely reducing fuel permeation through the end sections of fuel hose 1. Furthermore, in this producing method, it is possible to improve the adherence property of end covering material 5 to the inner surface of hose main body 1A, for example, by mixing an adhesive component into the resin material or by modifying the resin material.

Thus, end covering material 5 can be easily formed to the hose main body 1A upon selecting one of the above producing methods, thereby providing fuel hose 1 which can largely reduce fuel permeation through the end section of fuel hose 1.

While end covering material 5 has been shown and described as being provided throughout the surface region including the inner peripheral surface at a part extending from the sealing position S to the end face of innermost layer 2 and the end face of innermost layer 2 in the above embodiment, it will be appreciated that a surface modification such as halogenation or epoxidation may be continuously made for at least the surface region including the inner peripheral surface at a part extending from the sealing position S to the end face of innermost layer 2 and the end face of innermost layer 2, thus forming a modified surface portion at the inner peripheral surface and the end face of innermost layer 2. It will be understood that the modified surface portion serves as end covering material 5 and therefore very effective for the purpose of the present invention. In this case, the modified surface portion preferably has a surface hardness of not higher than A80, measured by a durometer type A according to JIS (Japanese Industrial Standard) K 6253.

Thus, fuel hose 1 provided with the above modified surface portion can be sufficient in sealing ability to connection-partner member 10 and in the pull-out force. The sufficient sealing ability and pull-out force can be stably obtained in fuel hose 1. It is to be noted that if the modified surface portion has a surface hardness exceeding A80, the stiffness of the modified surface portion becomes excessive thereby degrading the tight contact characteristics to connection-partner member 10 and degrading a good sealing ability. Accordingly, it is preferable that the modified surface portion has a surface hardness of not higher than A80, so that a good sealing ability can be obtained between the modified surface portion and connection-partner member 10.

An example of the producing method for fuel hose 1 provided with the above modified surface portion is as follows: Hose main body 1A is dipped in a solution containing hydrogen peroxide or hypochlorous acid in such a manner that the inner peripheral surface and the end faces of hose main body 1A are brought into contact with the solution. As a result, the surface modification can be made for at least the surface region including the inner peripheral surface at a part extending from the sealing position S to the end face of innermost layer 2 and the end face of innermost layer 2. Also this producing method can provide the modified surface portion or end covering material 5 stable in strength and low in fuel permeability, thus largely reducing fuel permeation through the end sections of fuel hose 1.

EXAMPLES

The present invention will be more readily understood with reference to the following Examples in comparison with Comparative Examples; however, these Examples are intended to illustrate the invention and are not to be construed to limit the scope of the invention.

First, a hose main body 1A of the three-layer structure as shown in FIG. 1 was prepared by subjecting materials to extrusion forming, followed by vulcanization. The hose main body 1A included innermost layer 2 formed of acrylonitrile-butadiene copolymer rubber (NBR) and having a thickness of 1.0 mm, intermediate layer 3 formed of tetrafluoroethylene-hexafluoropropylene-vinylidene fluoride copolymer (THV) and having a thickness of 0.2 mm, and outermost layer 4 formed of epichlorohydrin rubber (ECO) and having a thickness of 2.8 mm. Hose main body 1A had a total thickness of 4.0 mm, an inner diameter of 34 mm and a length of 350 mm. The acrylonitrile-butadiene copolymer rubber (NBR) forming innermost layer 2 had a fuel permeability coefficient (discussed after) of simulated fuel (discussed after) at 40° C., of 900 mg·mm/m$^2$/24 h.

Example 1

Amine-based primer was coated at the opposite end regions of the inner peripheral surface of hose main body 1A and the opposite end faces of hose main body 1A, followed by drying. Each end region extended from the end face to a longitudinal position of 30 mm from the end face. The primer-coated surface of hose main body 1A was then coated with a solution which had been prepared by dissolving 15% by weight of powder of tetrafluoroethylene-hexafluoropropylene-vinylidene fluoride copolymer ("THV 220" produced by DYNEON) in methylethyl ketone (MEK). Then, the coated surface of hose main body 1A was subjected to drying at 40° C. for 30 minutes, followed by further drying at 100° C. for 30 minutes, thereby forming end covering material 5 made of tetrafluoroethylene-hexafluoropropylene-vinylidene fluoride copolymer (THV) as a film having a thickness of 0.1 mm, thus producing fuel hose 1 of this Example. The THV had a fuel permeability coefficient of simulated fuel (discussed after) at 40° C., of 10 mg·mm/m$^2$/24 h and a tensile elastic modulus of 200 MPa. Accordingly, end covering material 5 had a value of the tensile elastic modulus×the thickness, of 20 MPa·mm.

Example 2

The opposite end regions of the inner peripheral surface of hose main body 1A and the opposite end faces of hose main body 1A in a state of having been not yet vulcanized were coated with a solution which had been prepared by dissolving 15% by weight of powder of tetrafluoroethylene-hexafluoropropylene-vinylidene fluoride copolymer ("THV 220" produced by DYNEON) in methylethyl ketone (MEK), by using a brush. Each end region extended from the end face to a longitudinal position of 30 mm from the end face. Then, the coated hose main body 1A was subjected to vulcanization under a condition of 150° C. for 30 minutes, thereby forming end covering material 5 as a film, thus producing fuel hose 1 of this Example. End covering material 5 had a thickness of 0.1 mm, and therefore had a value of the tensile elastic modulus×the thickness, of 20 MPa·mm.

Example 3

Hose main body 1A was dipped in a mixture solution of aqueous solution of hydrogen peroxide and aqueous solution of formic acid in such a manner that the opposite end regions of the inner and outer peripheral surfaces of hose main body 1A and the opposite end faces of hose main body 1A were brought into contact with the mixture solution, at 60° C. for 10 minutes. Each end region extended from the end face to a longitudinal position of 30 mm from the end face. Then, the hose main body 1A was dried at room temperature thereby forming a modified surface portion at the opposite end regions of the inner peripheral surface of hose main body 1A and the opposite end faces of hose main body 1A, thus producing fuel hose 1 of this Example. The modified surface portion had a surface hardness of A80 measured by the type A durometer according to JIS K 6253.

Comparative Example 1

Hose main body 1A in a state that its opposite end sections had not yet been subjected to any treatment was prepared to serve as fuel hose 1 of this Comparative Example.

Comparative Example 2

The inner peripheral surface of hose main body 1A and the end faces of hose main body 1A were coated with a solution which had been prepared by dissolving 15% by weight of powder of tetrafluoroethylene-hexafluoropropylene-vinylidene fluoride copolymer ("THV 220" produced by DYNEON) in methylethyl ketone (MEK). Then, the coated surface of hose main body 1A was subjected to drying at 40° C. for 30 minutes, followed by further drying at 100° C. for 30 minutes, thereby forming end covering material 5 made of tetrafluoroethylene-hexafluoropropylene-vinylidene fluoride copolymer (THV) as a film having a thickness of 0.15 mm. Thus, fuel hose of this Comparative Example was produced. End covering material 5 had a value of the tensile elastic modulus×the thickness, of 30 MPa·mm.

Comparative Example 3

The inner peripheral surface of hose main body 1A and the end faces of hose main body 1A were coated with a solution which had been prepared by dissolving 15% by weight of powder of tetrafluoroethylene-hexafluoropropylene-vinylidene fluoride copolymer ("THV 220" produced by DYNEON) in methylethyl ketone (MEK). Then, the coated surface of hose main body 1A was subjected to drying at 40° C. for 30 minutes, followed by further drying at 100° C. for 30 minutes, thereby forming end covering material 5 made of tetrafluoroethylene-hexafluoropropylene-vinylidene fluoride copolymer (THV) as a film having a thickness of 0.1 mm. Thus, fuel hose of this Comparative Example was produced.

Comparative Example 4

Hose main body 1A was dipped in a mixture solution of aqueous solution of hydrogen peroxide and aqueous solution of formic acid in such a manner that the opposite end regions of the inner and outer peripheral surfaces of hose main body 1A and the opposite end faces of hose main body 1A were brought into contact with the mixture solution, at 60° C. for 100 minutes. Each end region extended from the end face to a longitudinal position of 30 mm from the end face. Then, the hose main body 1A was dried at room temperature thereby forming a modified surface portion at the opposite end regions of the inner peripheral surface of hose main body 1A and the opposite end faces of hose main body 1A. Thus, fuel hose of this Comparative Example was produced. The modified surface portion had a surface hardness of A85 measured by the type A durometer according to JIS K 6253.

Evaluation Tests

Fuel hoses of Examples 1 to 3 and of Comparative Examples 1 to 4 were subjected to evaluation tests for fuel permeation resistance, sealing ability, pull-out force and adhesion of end covering material (film). Results of these evaluation tests are shown in Table 1.

The evaluation test for fuel permeation resistance was conducted as follows: Simulated fuel was poured into the opening of fuel hose (1) while the opposite ends of fuel hose were tightly closed respectively with metal plugs each of which was provided with an annular bead or bulged (enlarged) portion and had an outer diameter of 35.0 mm and an outer diameter of the bulged portion, of 37.0 mm. More specifically, the metal plugs were respectively inserted into the openings of the opposite end sections of the fuel hose. Then, wire clamps were respectively fitted on the opposite end sections and tightened under a torque of 0.13 kgf·cm. Thereafter, a reduction in weight (or fuel permeation amount) in an atmosphere of 40° C. was measured thereby evaluating the fuel permeability. The simulated fuel was prepared by mixing 45% by weight of isooctane, 45% by weight of toluene and 10% by weight of ethanol. A fuel permeation amount of less than 400 mg/day was evaluated as "A (excellent)". A fuel permeation amount between 400 to 500 mg/day (corresponding to that of the fuel hose of Comparative Example 1) was evaluated as "B (good)". A fuel permeation amount of not less than 500 mg/day was evaluated as "C (bad)".

The evaluation test for sealing ability was conducted as follows: A metal plug was inserted into the opening of the fuel hose through one end of the fuel hose. Then, a wire clamp was fitted on the end section and tightened under a torque of 0.13 kgf·cm. Thereafter, the simulated fuel was supplied through the other end of the fuel hose into the opening of the fuel hose at a pressure rising rate of 100 kPa/min. under a circumference of −40° C., in which a pressure (or fuel leak pressure) at which fuel leaks was measured from the side of the metal plug upon observing fuel leak by naked eye. The fuel leak pressure of not lower than 0.1 MPa was evaluated as "A (excellent)". The fuel leak pressure between 0.05 to 0.1 MPa (corresponding to that of the fuel hose of Comparative Example 1) was evaluated as "B (good)". The fuel leak pressure of lower than 0.05 MPa was evaluated as "C (bad)".

The evaluation test for the pull-out force was conducted as follows: A metal plug was inserted into the opening of an end section of the fuel hose. Then, a wire clamp was fitted on the end section of the fuel hose and tightened under a torque of 0.13 kgf·cm. Thereafter, the fuel hose was pulled from the metal plug at a pulling rate of 50 mm/min. by using a tensile tester. The maximum load (or the pull-out force) at the time when the fuel hose got out of the metal plug was measured by the tensile tester. The pull-out force of not less than 400 N was evaluated as "A (excellent)". The pull-out force between 300 to 400 (corresponding to that of Comparative Example 1) was evaluated as "B (good)". The pull-out force of not higher that 300 N was evaluated as "C (bad)".

The evaluation test (cross-cut adhesion test) for the adhesion of the end covering material (film) was conducted as follows: As a preliminary treatment, an end section of the fuel hose was dipped in the simulated fuel at 40° C. for 1 week, and then the fuel hose absorbing the simulated fuel was dried in a vacuum drier. Thereafter, plural crosswise cuts was formed on the end covering material (film) by using a cutting blade in such a manner as to form 100 squares (each of which has a dimension of 2 mm×2 mm), in which each cut had a depth reaching a bed on which the end covering material was formed. An adhesive tape was applied on the end covering material so as to cover the 100 squares. Then, the adhesive tape was peeled off at a breath. At this time, the survival (remaining) rate of the squares of the end covering material on the bed was measured. The survival rate of not less than 90% was evaluated as "B (good)". The survival rate of less than 90% was evaluated as "C (bad)".

TABLE 1

| | Fuel permeation resistance | Sealing ability | Pull-out force | Adhesion of end covering material |
|---|---|---|---|---|
| Example 1 | A | B | B | B |
| Example 2 | A | B | B | B |
| Example 3 | A | B | B | B |
| Comparative Example 1 | B | B | B | — |
| Comparative Example 2 | C | C | B | B |
| Comparative Example 3 | C | C | B | C |
| Comparative Example 4 | C | C | B | B |

As appreciated from the evaluation results shown in Table 1, all the fuel hoses of Examples 1 to 3 exhibit excellent fuel permeation resistance as compared with the fuel hose of Comparative Example 1, and exhibit similar sealing ability and pull-out force to those of the fuel hose of Comparative Example 1. In other words, it has been confirmed that the hoses of Examples 1 to 3 securely obtain sufficient sealing ability and pull-out force while being largely reduced in fuel permeation. Additionally, it has been confirmed that the value of the tensile elastic modulus×the thickness is preferably not higher than 20 MPa·mm, upon comparison of the evaluation results of Examples 1 and 2 with that of Comparative Example 2. It has been also confirmed that the hardness of the modified surface portion of the fuel hose is preferably not higher than A80, upon comparison between the evaluation result of Example 3 and that of Comparative Example 4.

While the fuel hose according to the present invention has been discussed with reference to Examples, it will be understood that the structure and producing method of the fuel hose are not limited to the embodiments, and therefore a variety of modifications may be made within the scope of the present invention. For example, the end covering material may be formed of an organic material such as polyamide-based resin, polyester-based resin, fluororesin and/or acrylic resin, or formed of an inorganic material such as aluminum, glass and/or carbon.

Although the surface modification for forming the modified surface portion in the innermost layer has been described as being made by means of epoxidation or halogenation (chlorination), it will be appreciated that the surface modification may be made by means of irradiation of ultraviolet ray or electron beam so that cross-linking occurs at the surface portion of the innermost layer. The innermost layer may be formed of not only rubber but also a synthetic resin containing thermoplastic elastomer. Furthermore, although the fuel hose has typically a circular cross-section, the fuel hose may have cross-sections other than the circular cross-section.

As appreciated from the above, according to the present invention, fuel permeation through the end section of the fuel hose can be largely reduced while ensuring a sufficient sealing ability to the connection-partner member which is to be fitted in the opening of the end section of the fuel hose and the sufficient pull-out force for pulling out the connection-partner member from the fuel hose.

The entire contents of Japanese Patent Application P2002-156026 (filed May 29, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A fuel hose having an opening through which fuel flows and an end section to which a connection-partner member is to be fitted, the connection partner being configured to be inserted into the opening at the end section, comprising:

an innermost layer formed of a material selected from the group consisting of rubber and synthetic resin, the innermost layer having an inner surface defining the opening and having an end face corresponding to an end face of the end section of the fuel hose;

an outer layer formed outside the innermost layer and formed of a material lower in fuel permeability coefficient than the innermost layer; and an end covering material comprising an organic material and covering a the inner surface of the innermost layer at a part extending from a distal position up to the end face of the innermost layer and covering at least a portion of the end face of the innermost layer, the end covering material being lower in fuel-permeability coefficient than the innermost layer.

2. A fuel hose as claimed in claim 1, wherein the end covering material has a thickness of not more than 0.3 mm, and wherein the end covering material has a value, obtained by multiplying its tensile elastic modulus (MPa) by its thickness (mm), of from a value larger than 0 to a value of not larger than 20.

3. A fuel hose as claimed in claim 1, wherein the end covering material extends radially outwardly to reach the outer layer so as to cover the whole end face of the innermost layer.

4. A fuel hose according to claim 1, wherein the organic material comprises a polyamide-based resin.

5. A fuel hose according to claim 1, wherein the organic material comprises a polyester-based resin.

6. A fuel hose according to claim 1, wherein the organic material comprises a fluororesin.

7. A fuel hose according to claim 1, wherein the innermost layer comprises acrylonitrile-butadiene rubber and the end covering material is formed of a material comprising a polyamide-based resin, a polyester-based resin, a fluororesin and/or an acrylic resin.

8. A fuel hose according to claim 1, wherein the innermost layer comprises a blend of acrylonitrile-butadiene rubber and polyvinyl chloride and the end covering material is formed of a material comprising a polyamide-based resin, a polyester-based resin, a fluororesin and/or an acrylic resin.

9. A fuel hose according to claim 1, wherein the innermost layer comprises fluororubber and the end covering material is formed of a material comprising a polyamide-based resin, a polyester-based resin, a fluororesin and/or an acrylic resin.

10. A fuel hose according to claim 1, wherein end covering material comprises an a cylindrical film section and an annular flange film section integrally formed with the cylindrical film section, the annular flange film section sealingly covering a whole annular end face of the innermost layer.

11. A fuel hose according to claim 1, further comprising an adhesive or primer layer disposed between the innermost layer and the end covering material.

12. A fuel hose having an opening through which fuel flows and an end section to which a connection-partner member is to be fitted, the connection-partner member being configured to be inserted into the opening at the end section, comprising:

an innermost layer formed of rubber, the innermost layer having an inner surface defining the opening and having an end face corresponding to the end section of the fuel hose;

an outer layer formed outside the innermost layer and formed of a material lower in fuel permeability coefficient than the innermost layer;

an end covering material covering the inner surface of the innermost layer at a part extending from a distal position up to the end face of the innermost layer and at least a portion of the end face of the innermost layer; and an adhesive or primer layer disposed between the innermost layer and the end covering material.

13. A fuel hose according to claim 12, wherein the end covering material comprises an organic material.

14. A fuel hose according to claim 12, wherein the end covering material comprises a glass and/or carbon.

15. A fuel hose having an opening through which fuel flows and an end section to which a connection-partner member is to be fitted, the connection partner being configured to be inserted into the opening at the end section, comprising:

an innermost layer formed of a material selected from the group consisting of rubber and synthetic resin, the innermost layer having an inner surface defining the opening and having an end face corresponding to an end face of the end section of the fuel hose;

an outer layer formed outside the innermost layer and formed of a material lower in fuel permeability coefficient than the innermost layer;

an end covering material comprising an organic material and covering the inner surface of the innermost layer at a part extending from a distal position up to the end face of the innermost layer and covering at least a portion of the end face of the innermost layer, the end covering material being lower in fuel permeability coefficient than the innermost layer; and an adhesive or primer layer disposed between the innermost layer and the end covering material.

* * * * *